April 2, 1929.  A. H. LEIPERT  1,707,309
RESILIENT COUPLING
Filed May 12, 1925   2 Sheets-Sheet 1

INVENTOR
AUGUST H. LEIPERT
BY his
ATTORNEYS

April 2, 1929.                A. H. LEIPERT                1,707,309
                          RESILIENT COUPLING
                          Filed May 12, 1925             2 Sheets-Sheet 2
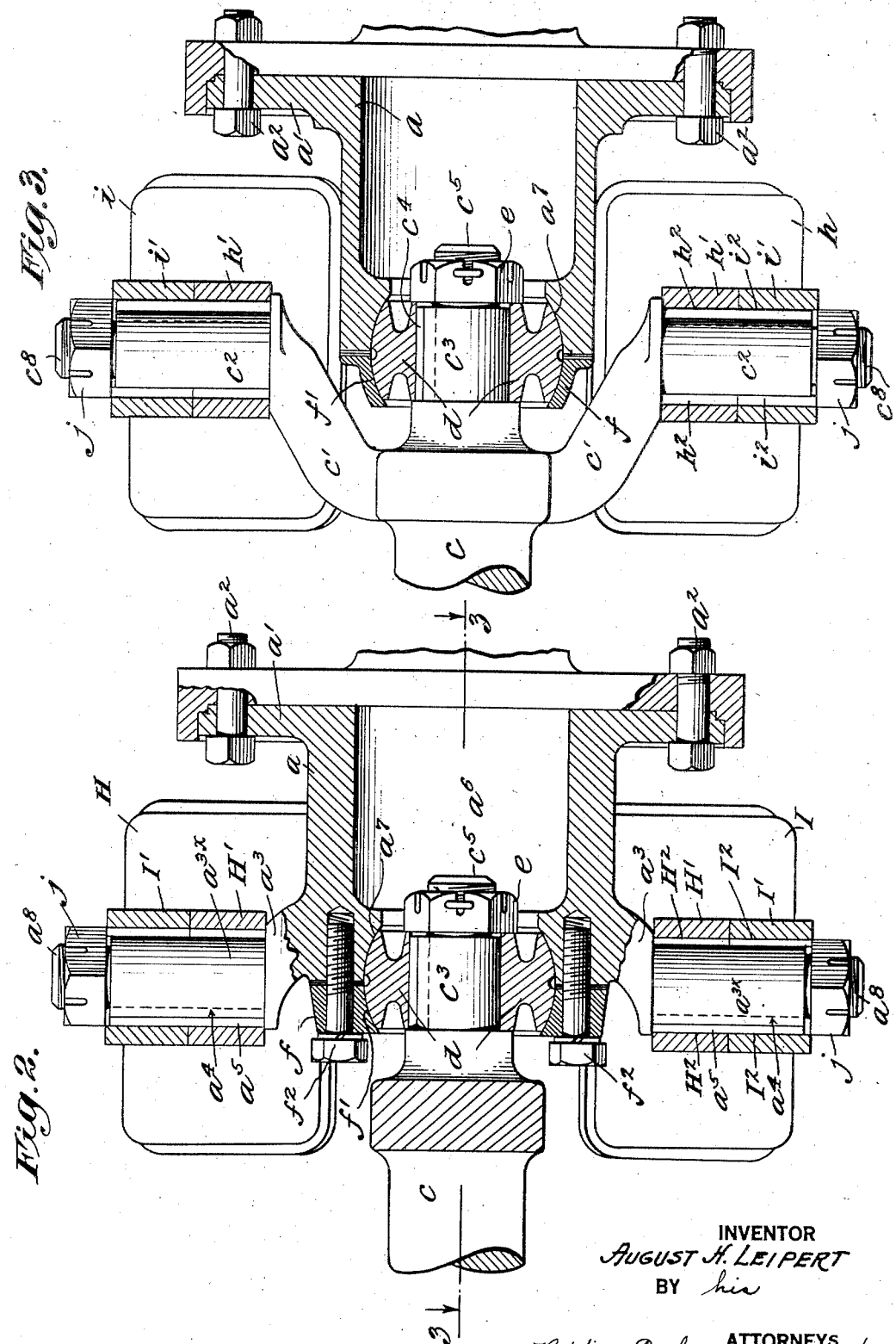
INVENTOR
AUGUST H. LEIPERT
BY his
ATTORNEYS Patented Apr. 2, 1929.

1,707,309

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

RESILIENT COUPLING.

Application filed May 12, 1925. Serial No. 29,682.

This invention relates to a resilient coupling or universal joint of the kind in which torsional stresses are transmitted between rotatable elements through yielding non-metallic material which serves to cushion or absorb to a degree the shocks and stresses ordinarily set up in the transmission of driving torque between the respective elements. The invention has for its particular object the provision of a construction involving the use of blocks of yielding non-metallic material, which may be retained under compression and through which driving forces are transmitted, in a construction which shall be practical from the standpoint of manufacture, ease of assembly and disassembly and efficient in use. In accordance with the invention blocks of yielding non-metallic material are retained between seats carried with arms upon the respective elements between which driving forces are to be transmitted, which seats are readily removable from the arms in the interest of ease of assembly of the blocks. The invention will be more apparent from the following detailed description of the accompanying drawings illustrating a preferred embodiment thereof in which:

Figure 2 is a view taken in the plane indicated by the line 2—2 in Figure 1 and looking in the direction of the arrows and showing the manner of attachment of the seats for the blocks of yielding non-metallic material to one of a pair of relatively movable members, say the driving member.

Figure 3 is a view similar to Figure 2 and showing seats for the yielding non-metallic material carried with the other of the relatively movable members and taken in the plane indicated by the line 3—3 in Figure 2 and looking in the direction of the arrows.

Figure 1:
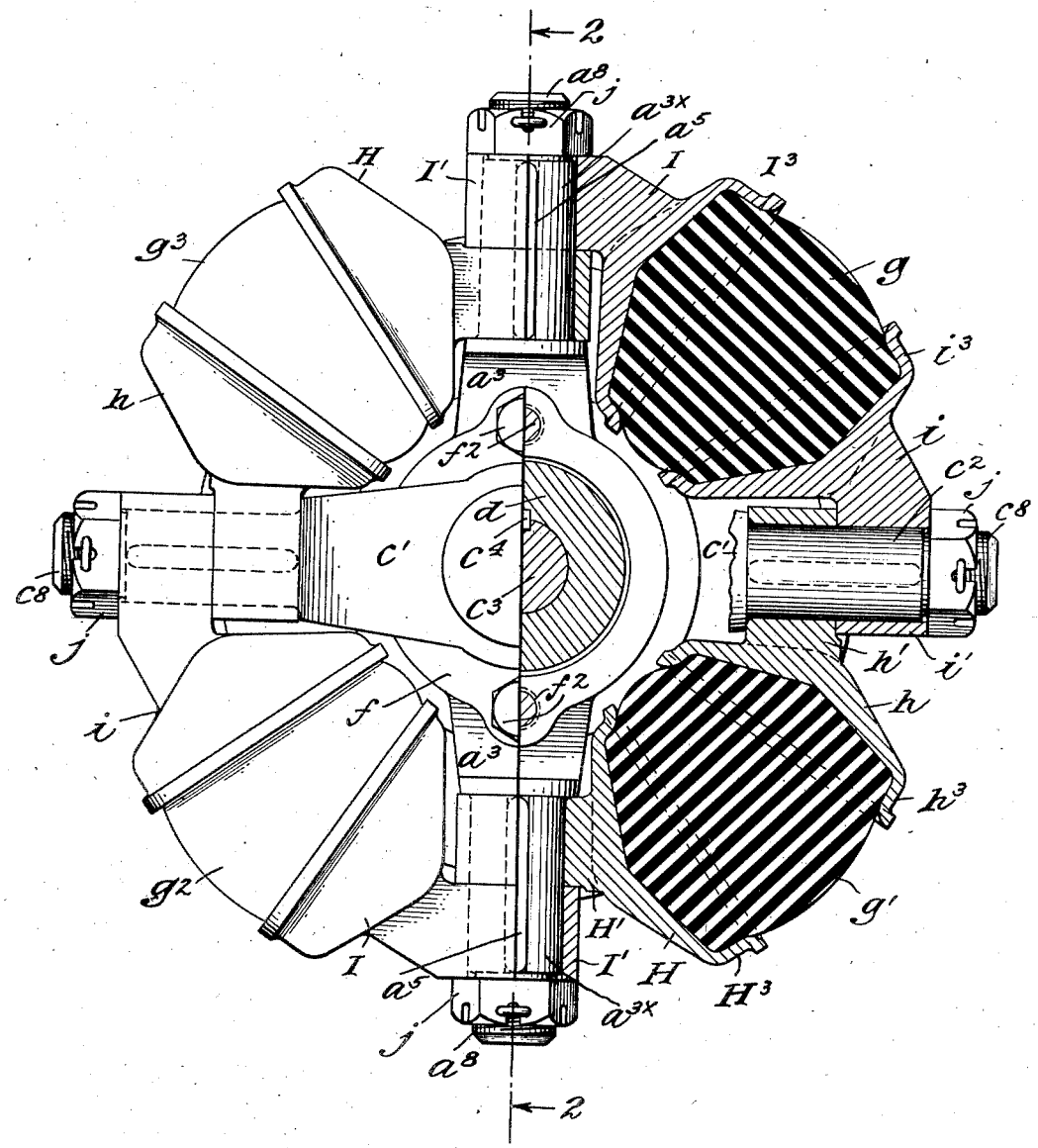
Figure 1 is a view partly in section and partly in elevation of a universal joint or torque cushioning device according to the present invention.

It will be understood in connection with the following description that although one of the relatively movable members is referred to throughout as the driving member while the other member to which it is connected by the resilient coupling according to the present invention is referred to throughout as the driven member that this distinction is arbitrary and either of the relatively movable members may be the driving member or the driven member.

Referring first to Figure 2 a driving member $a$ is provided with a flange $a'$ for attachment, as by the bolts $a^2$, to a co-operating flange on a transmission, brake unit, rear axle or the like. The driving member $a$ is provided with a plurality of arms $a^3$ or extensions shown, in the illustrated embodiment, as two in number diametrically disposed with respect to one another. These arms are turned to cylindrical form as shown at $a^{3x}$ and have key-ways $a^4$ milled therein for the reception of keys $a^5$ adapted to position the seats for the blocks of yielding non-metallic material in a manner which will be described more particularly hereinafter. Driving member $a$ is formed interiorly with a cylindrical recess $a^6$ and centrally of the arms it is formed with a spherical seat portion $a^7$ forming part of a centering device for the resilient coupling. The driven member is indicated at $c$ and is shown as also provided with a pair of diametrically disposed arms $c'$ turned at their ends as at $c^2$ and milled for key ways in a manner similar to the arms $a^3$. Inwardly of the arms $c'$ driven member $c$ is turned as at $c^3$ to receive a spherical centering member $d$ which may be milled to receive a key $c^4$ seated in a key way formed in the end $c^3$ and secured by means of a nut $e$ mounted on the threaded end $c^5$ of the extension $c^3$. To retain the centering device in position a cap member $f$ also formed with a spherical seat $f'$ may be secured as by the bolts $f^2$ to driving member $a$.

Referring now to Figure 1 it will be observed that the blocks of yielding non-metallic material $g$, $g'$, $g^2$ and $g^3$ are retained between seats carried with the respective driving and driven arms $a^3$, $c^1$. The seats are formed in individual seat members removably mounted on the turned ends $a^{3x}$ and $c^2$. One set of seat members such as $h$, H is adapted to be disposed upon the arms $c^2$, $a^{3x}$, respectively, inwardly of other seat members $i$, I. Each of the seat members or cups is formed with an apertured boss $h'$, H$'$, $i'$, I$'$ to fit over the turned ends $c^2$ and $a^{3x}$, respectively. Interiorly each boss is formed with diametrically disposed key-ways $h^2$, $H^2$, $i^2$ and $I^2$ whereby the cup member is keyed against relative movement with respect to the arm. By the provision of diametrically disposed key ways the cups, say $h$, $H$ are interchangeable. The ends of the arms $a^{3x}$ and $c^2$ are threaded as at $a^8$ and $c^8$ respectively, and adapted to receive nuts $j$ which serve to secure the cup members in position on the arms. Between the respective cups $h$, $H$, $i$ and $I$, the blocks $g$, $g'$, $g^2$ and $g^3$ are disposed under compression, the internal static pressure being set up in the blocks during assembly of the device.

To assemble the resilient coupling according to the present invention the centering ball $d$ is mounted upon the driven member $c$ and disposed within the spherical seat surface $a^7$, whereafter the cap $f$ is secured in place by the bolts $f^2$ to retain bolt $d$ in place. Thus driving member $a$ and driven member $c$ are centralized with respect to one another while at the same time angular motion between the two members is permitted. The inner cup member $H$ is then started on arm $a^{3x}$ and a rubber block $g'$ is placed within the cup. Another inner cup member $h$ is similarly started on arm $c^2$ engaging in like manner the block $g'$. The unit is then pushed down to innermost position. This operation is then repeated for the block $g^3$ whereafter the cups $i$ and $I$ are assembled upon the blocks $g$ and $g^2$ and keyed on the arms $c^2$ and $a^{3x}$, respectively. Outwardly of the bosses $h'$ and $H'$ nuts $j$ are then threaded home on each of the arms whereby each pair of rubber cups are brought closer together thereby compressing the rubber blocks. Any desired degree of initial pressure may be obtained by varying the free length of a block.

In operation the extensions $a^{3x}$ on the driving member compress the rubber blocks $g^3$ and $g'$ ahead of the extensions in the direction of rotation towards the driven member $c$. Compression on the blocks $g^2$ and $g$ is released at this time. When the rotation of the elements is reversed the other pair of blocks is, of course, under compression to transmit the driving forces. Any misalignment or angular motion of the shafts is compensated for within the blocks of yielding non-metallic material between the flange portions $i^3$, $I^3$ and $h^3$ and $H^3$ as the blocks are retained tightly within the cups by the compression of the rubber. There is no relative motion between the blocks and the cups and consequently no wear takes place, all angular motion being compensated for within the body of the block itself by what is termed the jellying of the yielding non-metallic material.

It will thus be seen that a resilient coupling has been provided which complies with the requirements of standard practice today and may be assembled by one man with the use of only standard tools.

Various modifications may be made in the number and disposition of the blocks and the arms to which they are secured as well as in the configuration of the seat members and no limitation is intended by the illustration or the foregoing description except as indicated in the accompanying claims.

What I claim is:

1. In a resilient coupling, the combination with a pair of shafts, one of which is to be driven by the other, of arms carried with the shafts, respectively, seats carried with the arms, yielding non-metallic material disposed between the seats, means to secure positively, the yielding material fixedly in the seats and hold it against displacement with respect thereto, and means to adjust the seats radially with respect to the axes of the shafts.

2. In a resilient coupling, the combination with a pair of shafts, one of which is to be driven by the other, of a plurality of arms carried with the respective shafts, removable seats carried with the arms, means to secure the seats to the arms against displacement, yielding non-metallic material disposed between the seats, means to secure positively the yielding material fixedly in the seats and hold it against displacement with respect thereto, and means to adjust the seats radially to vary the compression set up in the non-metallic material.

3. In a resilient coupling, the combination with a pair of shafts, one of which is to be driven by the other, of a spider formed with diametrically disposed arms and means to secure said spider to one of the shafts, a second spider formed with diametrically disposed arms and means to secure said spider to the other shaft whereby the arms formed thereon are disposed at right angles to the first named arms, seat members formed with apertured lugs engaging the arms, respectively, means to position the lugs with respect to the arms whereby respective seats oppose one another, yielding non-metallic material disposed between the seats, means to secure positively the yielding material fixedly in the seats and hold it against displacement with respect thereto, and locking means for the lugs on the arms.

4. In a resilient coupling, the combination with a pair of shafts, one of which is to be driven by the other, of a spider formed with diametrically disposed arms, and means to secure said spider to one of the shafts, a second spider formed with diametrically disposed arms and means to secure said spider to the other shaft whereby the arms formed thereon are disposed at right angles to the first named arms, seat members formed with apertured lugs engaging the arms, respectively, means to position the lugs with respect to the arms whereby respective seats oppose one another, yielding non-metallic material disposed between the seats, means to secure positively the yielding material fixedly in the seats and hold it against displacement with respect thereto, locking means for the lugs on the arms, and a ball shaped centering device carried with one spider, a spherical seat member carried with the other spider, and means to secure the centering device within the seat with provision for relative movement therewithin.

This specification signed this 7th day of May, A. D. 1925.

AUGUST H. LEIPERT.